3,036,041
REACTION PRODUCTS OF EPOXYLATED COMPOSITIONS AND PROCESS
Harlan E. Tarbell, Jr., Elmhurst, Ill., assignor to The Richardson Company, Melrose Park, Ill., a corporation of Ohio
No Drawing. Filed Dec. 23, 1957, Ser. No. 704,340
12 Claims. (Cl. 260—47)

This invention relates to new and improved resinous compositions and, more particularly, to those resins which are derived from epoxylated compositions.

Considerable development has occurred in the field of epoxy resins, as is evidenced by the various commercial compositions of this type which are available on the market. Typical of such epoxy resins are those produced by Shell Chemical Company, one example of which is sold under the name of Epon 828. This resin and most of the epoxy resins which are commercially available are derived from a reaction of a compound containing the ethylene oxide or oxirane group with a polyhydric polynuclear phenolic compound wherein the phenolic nuclei are connected together by carbon bridges. One such phenolic compound is di (p-hydroxyphenyl) dimethylmethane, sometimes referred to as Bisphenol-A. Illustrative compounds containing the ethylene oxide group are the epihalogenhydrins or dihalogenhydrins and, more particularly, epichlorhydrin. As indicated in the publication "Epoxy Resins" by Lee and Neville, 1957, the reaction products of epihalohydrins, such as epichlorohydrin with polyhydric polynuclear phenolic compounds, are frequently referred to as glycidyl ethers.

While epoxy resins such as Shell's Epon 828 have tended to dominate the commercial field of epoxy resins, other epoxy resins have also become known, such as those derived from novolaks. These latter compounds are permanently fusible resins containing a plurality of phenolic nuclei, generally formed by condensing a phenol with formaldehyde in the presence of an acid catalyst. Novolaks may likewise be reacted with a compound such as epichlorhydrin to form polyglycidyl ethers.

All epoxy compositions contain the reactive ethylene oxide or oxirane group.

Resinous epoxylated compositions may normally be cured to a final hardened product by treating with agents having at least two functional groups each of which is capable of reacting with an ethylene oxide group. Curing results from cross linking wherein each of the functional groups of the curing agent reacts with different epoxy groups in the resin. Typical curing agents which have been employed are polyamines, poly basic acids and acid anhydrides. In all such instances, it has been understood that complete curing through the medium of extensive cross linking can only be accomplished by using a curing agent having at least two functional groups, such as the carboxylic group (—COOH), the primary amine group (—NH$_2$) or even a secondary amine group (—NH—).

It has now been found that curing and enhanced properties can be obtained by reacting epoxy compositions with conjugated polyolefinic compounds, for example, conjugated polyolefinic acids, even though such acids are mono basic and, hence, contain only one functional group in the normal sense. Thus, it has been discovered that even though conjugated polyolefinic acids contain only one carboxylic group, they may still be used to cure an epoxy resin to a final hard product having properties, such as hardness and heat distortion, which are, in many cases, superior to corresponding properties obtainable with commonly accepted curing agents, for example, saturated poly basic acids.

The conjugated polyolefinic compounds contemplated by this invention have the following basic structure:

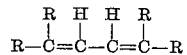

wherein R is a member of the class consisting of hydrogen, a hydrocarbon radical, a carboxylic group, a primary amine group, a hydrocarbon radical containing a carboxylic group and a hydrocarbon radical containing an amine group, provided that at least one R is selected from the last four members of the class. As indicated by the above structure, these conjugated polyolefinic compounds may be long chain unsubstituted compounds or they may contain a variety of substituted radicals located at any point in the chain, including phenyl radicals. However, each polyolefinic compound must contain at least one functional group capable of reacting with an ethylene oxide group.

In general, the reaction of conjugated polyolefinic compounds with an epoxylated resin is believed to undergo two basic steps, although it is not intended to thereby limit the invention by suggesting this theory of reaction. The first step in the curing process is believed to be that wherein the functional group of the conjugated polyolefinic compound, for example the carboxylic group, reacts with the ethylene oxide group of the epoxy compound to form an ester. Continued heating under appropriate conditions indicates that subsequent reactions occur, whereby the conjugated polyolefinic part of the ester reacts with corresponding unsaturated parts of the same or adjacent molecules by way of the Diels-Alder reaction, thereby resulting in a highly cross linked product. Under this theory, it is evident that the conjugated unsaturated compound need contain only one functional group to form the initial ester with an ethylene oxide group. The presence of two or more functional groups in the curing agent will, of course, provide additional mechanisms for obtaining cross linking and will enhance the chance of forming the initial ester which is believed to occur in the first stage of the reaction.

Typical examples of reactions of conjugated unsaturated compositions with epoxy resins are set forth below.

*Example 1*

A mixture was made comprising 70.4 parts by weight of Epon 828, 29.3 parts by weight of sorbic acid (2,4-hexadienoic acid) and 0.3 part of catalyst (N,N-dimethyl-a-methylbenzylamine) which was heated until it was homogeneous. This mixture was then poured into a ½ x ½ x 6 inch mold and then heated for 72 hours at 130° C. After cooling, the mold was disassembled and a clear void-free casting was removed. The casting was found to have a Barcol hardness of 35 and a heat distortion temperature of 72° C., as determined by the ASTM test D648–45T. The bar was also found to have a flexural strength of 17,000 p.s.i. and a compressive strength of 19,500 p.s.i.

Epon 828 resin is sold by Shell Chemical Company and has been determined to have an average molecular weight of 384 with the equivalent of two epoxy groups per mole.

*Example 2*

71.2 parts by weight of an epoxylated novolak (prepared by reaction of epichlorohydrin with a novolak derived from a phenol-formaldehyde ratio of 2 to 1) was reacted with 28.5 parts by weight of sorbic acid in the presence of 0.3 part by weight of the accelerator of Example 1. The mixture was cured in a mold for six hours at 140° C. and then subjected to a cure outside of the mold for 66 hours at 120° C. The casting was found to have a Barcol hardness of 45, a heat distortion temperature of 93° C., a flexural strength of 9,000 p.s.i. and a compressive strength of 20,800 p.s.i.

*Example 3*

73.6 parts by weight of Epon 828 were reacted with 26.2 parts by weight of trans, trans-muconic acid and 0.2 part by weight of triethanolamine as an accelerator. The reaction was conducted in a mold for 20 hours at a temperature of 165° C. and was subjected to an additional cure, after removal from the mold, for two hours at 195° C. The resultant product was found to have a Barcol hardness of 80 and a heat distortion temperature of 82° C.

*Example 4*

53 parts by weight of Shell Epon 828 were reacted with 46.4 parts by weight of 5-phenyl-2,4-pentadienoic acid in the presence of 0.2 part by weight of diallylmelamine as a catalyst. The mixture was heated in a mold for 20 hours at 140° C. followed by a second heating for 72 hours at 150° C. The casting was then removed from the mold and heated for two hours at 183° C. The heat distortion temperature of the casting was found to be 92° C. It had a Barcol hardness of 74, a flexural strength of 6,000 p.s.i. and a compressive strength of 16,000 p.s.i.

The Barcol hardness tests were conducted using scale No. 935 in all of the foregoing examples.

Sorbic acid and 5-phenyl-2,4-pentadienoic acid are conjugated polyolefinic compounds containing only one carboxylic group, previously indicated as being a functional group. As is illustrated in the above examples, such compounds provide an excellent curing agent for epoxy resins even though they do not contain at least two functional groups as has been previously believed necessary. The trans, trans-muconic acid illustrates the fact that conjugated polyolefinic compounds containing two functional groups, which in this case are carboxylic groups, likewise produce excellent results when used as curing agents.

To further illustrate the effect of reacting a conjugated unsaturated acid with an epoxylated compound, comparisons can be made with corresponding saturated compounds. Thus, the saturated monobasic acid corresponding to sorbic acid, cited in the above examples, is caproic acid. A mixture comprising 62.8 parts by weight of Epon 828 and 36.7 parts by weight of caproic acid, together with 0.5 part of diallymelamine as an accelerator was made up and heated for 18 hours at 160° C. and then for two hours at 180° C. The mixture was found to be still liquid at the end of this period and had obviously not cured.

From the foregoing examples it can be seen that conjugated polyolefinic acids are capable of producing cured resinous compositions even though they do not contain two carboxylic acid groups as might normally be required.

While the epoxy derivatives of multi phenolic nuclei compounds have been emphasized as an initial starting material for reactions of the type contemplated, it is also within the scope of the invention to include the reaction products of conjugated polyolefinic compounds with epoxy derivatives of polyhydric phenolic compounds, such as hydroquinone, which have two hydroxyl groups attached to a single phenolic nuclei. Epoxy derivatives of hydroquinone and similar compounds having two phenolic hydroxyl groups are capable of forming resinous compositions comprising repeating units in a chain when reacted with curing agents of the type disclosed herein.

By appropriate control of reaction conditions, the compositions resulting from the reactions contemplated by this invention may be used as intermediates which can be further modified to obtain desired end products. In addition the present compositions may also be used to form molded products either alone or in combination with other materials such as rubber, fillers and the like.

Having described certain exemplary embodiments of the invention, the same is only intended to be limited by the scope of the following claims.

I claim:

1. A process for curing a polyglycidyl ether of a polyhydric phenol which consists of reacting said polyglycidyl ether with a conjugated polyolefinic compound having the structure

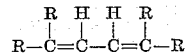

wherein R is a member of the class consisting of hydrogen, a hydrocarbon radical, a carboxylic group, a primary amine group, a hydrocarbon radical containing a carboxylic group and a hydrocarbon radical containing an amine group, provided that at least one R is selected from the last four members of the class, said reaction being conducted at a temperature and for such a time as to insure an addition reaction involving at least a part of the conjugated diene system.

2. A process as described in claim 1 wherein the conjugated polyolefinic compound is a monocarboxylic acid.

3. A process as described in claim 1 wherein the polyhydric phenol contains a plurality of phenolic nuclei.

4. A process as described in claim 3 wherein the polyhydric phenol is the fusible resinous condensation product of phenol and formaldehyde.

5. A process as described in claim 1 wherein the conjugated polyolefinic compound is a polycarboxylic acid.

6. A process of curing the polyglycidyl ether of di(p-hydroxyphenyl)dimethyl methane which consists of reacting said ether with sorbic acid at a temperature and for such a time as to insure an addition reaction involving at least a part of the conjugated diene system of the sorbic acid.

7. A resinous composition consisting of the reaction product of a polyglycidyl ether of a polyhydric phenol and a conjugated polyolefinic compound having the structure

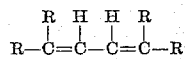

wherein R is a member of the class consisting of hydrogen, a hydrocarbon radical, a carboxylic group, a primary amine group, a hydrocarbon radical containing a carboxylic group and a hydrocarbon radical containing an amine group, provided that at least one R is selected from the last four members of the class, said reaction being conducted at a temperature and for such a time as to insure an addition reaction involving at least a part of the conjugated diene system.

8. A composition as described in claim 7 wherein the conjugated polyolefinic compound is a monocarboxylic acid.

9. A composition as described in claim 7 wherein the polyhydric phenol contains a plurality of phenolic nuclei.

10. A composition as described in claim 9 wherein the polyhydric phenol is the fusible resinous condensation product of phenol and formaldehyde.

11. A composition as described in claim 7 wherein the conjugated polyolefinic compound is a polycarboxylic acid.

12. A resinous composition consisting of the reaction product of the polyglycidyl ether of di(hydroxyphenyl)-methyl methane and sorbic acid wherein the reaction is conducted at a temperature and for such a time as to insure an addition reaction involving at least a part of the conjugated diene system of said sorbic acid.

References Cited in the file of this patent

UNITED STATES PATENTS

| | | |
|---|---|---|
| 2,500,765 | Montague | Mar. 14, 1950 |
| 2,681,901 | Wiles et al. | June 22, 1954 |
| 2,752,269 | Condo et al. | June 26, 1956 |
| 2,772,296 | Mueller | Nov. 27, 1956 |
| 2,839,495 | Carey | June 17, 1958 |
| 2,843,560 | Mika | July 15, 1958 |